United States Patent [19]

Magnusson et al.

[11] Patent Number: 5,227,937

[45] Date of Patent: Jul. 13, 1993

[54] SIDE-STIFFENED FLEXURAL PANTOGRAPHIC MOUNT FOR POSITIONING A MAGNETIC TRANSDUCING HEAD ASSEMBLY

[75] Inventors: Steven L. Magnusson, Redwood City; Bradley D. Blackwood, Saratoga, both of Calif.

[73] Assignee: Ampex Corporation, Redwood, Calif.

[21] Appl. No.: 669,565

[22] Filed: Mar. 14, 1991

[51] Int. Cl.$^5$ .................... G11B 21/08; G11B 5/48; G11B 21/16

[52] U.S. Cl. .................... 360/104; 360/109; 360/107; 360/77.01

[58] Field of Search ............... 360/104, 107, 108, 109, 360/77.01

[56] References Cited

U.S. PATENT DOCUMENTS

| | | | |
|---|---|---|---|
| 3,931,641 | 1/1976 | Watrous | 360/104 |
| 4,099,211 | 7/1978 | Hathaway | 360/109 |
| 4,151,569 | 4/1979 | Hathaway | 360/77 |
| 4,212,043 | 7/1980 | Baker | 360/104 |
| 4,268,880 | 5/1981 | Majima | 360/109 |
| 4,363,046 | 12/1982 | Saito | 360/106 |
| 4,367,504 | 1/1983 | Seki et al. | 360/109 |
| 4,441,128 | 4/1984 | Ohba et al. | 360/75 |
| 4,485,414 | 11/1984 | Baker | 360/10.3 |
| 4,642,707 | 2/1987 | Geiger et al. | |
| 4,647,999 | 3/1987 | Mlinarie et al. | 360/109 |
| 4,695,907 | 9/1987 | Inaji et al. | |
| 4,701,821 | 10/1987 | Muller | |
| 4,734,805 | 3/1988 | Yamada et al. | 360/104 |
| 4,860,137 | 8/1989 | Shtipelman | 360/104 |
| 5,047,883 | 9/1991 | Aldrich et al. | 360/109 |
| 5,063,466 | 11/1991 | Yamashita | |

FOREIGN PATENT DOCUMENTS

| | | |
|---|---|---|
| 0145331A3 | 6/1985 | European Pat. Off. |
| 0205207A1 | 12/1986 | European Pat. Off. |
| 0441035A1 | 8/1991 | European Pat. Off. |
| 2541546 | 8/1984 | France |
| 2225666A | 6/1990 | United Kingdom |

OTHER PUBLICATIONS

PCT International Application, Publication No. WO 89/09988 International Publication Date: Oct. 19, 1989. International Application No. PCT/US89/01467, International Filing Date: Apr. 7, 1989.

*Primary Examiner*—Stuart S. Levy
*Assistant Examiner*—Alfonso Garcia

[57] ABSTRACT

A flexural pantographic mount for use in a helical scan magnetic tape transport employing a closed loop servo system having a specified frequency bandwidth is disclosed. The mount includes a fixed body and a moveable body such as a magnetic transducing head assembly. First and second parallel spaced apart elongated flexible yet similar leaves have opposite ends, opposite edges and uniform thickness. The leaves are of similar material. One set of the opposite ends of the leaves are connected to the fixed body, the other set of opposite ends being connected to the moveable body. The leaves, when the moveable body assembly is subjected to a force having a component F perpendicular to the planes of the leaves, is flexed into an "S" shape with the moveable assembly undergoing a deflection D. Each leaf exhibits its primary mode stiffness K equal to the ratio F/D. The leaves also exhibit shapes defining secondary and even higher order natural mode vibrations with higher order frequencies falling beyond the servo system bandwidth. First and second edge extension, or side stiffening, strips of similar material are integral with the opposite edges of each corresponding leaf and form a side along the edge of the leaf. The integration of edge stiffener with its leaf occurs without altering the thickness of either edge or leaf so as to maintain the value of the primary mode stiffness as a substantially unaltered value while at the same time the frequencies of the higher order natural mode vibrations are raised to values substantially greater than the specified bandwidth of the closed loop system.

17 Claims, 8 Drawing Sheets

SIDE-STIFFENED FLEXURAL PANTOGRAPHIC MOUNT FOR POSITIONING A MAGNETIC TRANSDUCING HEAD ASSEMBLY

BACKGROUND OF THE INVENTION

1. Field of the Invention

This invention relates to magnetic signal transducers, also known as heads in the art, such as may be used in storing information in a magnetic storage medium, like magnetic tape, and in retrieving the information stored therein and, more particularly, this invention relates to an assembly for holding and supporting and varying the position of magnetic signal transducers.

2. Description of Related Art

As is known in the magnetic tape transport art, helical-scan magnetic tape transports employ one or more mounting assemblies for supporting and adjustably positioning a magnetic transducing head in a rotating drum. One such assembly is disclosed in U.S. Pat. No. 4,212,043, which was filed Nov. 1, 1978 and which issued Jul. 8, 1980 and which is incorporated herein by reference. There, adjustable mounts are secured to the interior of the rotating drum and extend radially toward the periphery of the drum with the head protruding through an opening in the drum to scan the recorded tracks on a magnetic tape curved around the periphery of the drum in a helical path. This adjustable mount permits the head to move laterally with respect to the length direction of a recorded track. Each adjustable mount, also known as a flexural pantographic mechanism in the art, includes a pair of parallel bending or pivoting leaf members anchored at one set of ends to a fixed body. The leaf members extend as cantilevered beams with the transducing head assembly mounted near the opposite set of ends in a manner so that the head assembly can operate as a moveable body. Each leaf assembly is suitably constructed so that, when a control voltage is applied such as by a tape transport head positioning servo system to a voice coil assembly, the leaf members deflect accordingly, thereby displacing the transducing head supported thereon. The extent and direction of the deflection of the head is proportional to and a function of the amplitude and polarity of the control voltage applied to the voice coil. When used in combination with a servo system feedback circuit, the head may be positioned in an optimum location for following a tape track, which has been recorded on the magnetic tape medium.

Such a head positioning arrangement has some disadvantages. For example, the inherent flexibility of usually long, thin head positioning leaf members sets up undesirable resonances in the leaf members under rapid and repetitive flexure loadings. Such resonances also result in undesirable deflections under repeated flexures of the leaf members. The occurrence of such conditions in the leaf members under the desired loading sequence can severely impair the ability of a head mounted on a leaf member to accurately follow a magnetic tape track. Such undesirable conditions can be substantially aggravated unless the frequencies of higher mode vibrations, also called oscillations in the art, are raised substantially higher than the frequency bandwidth of a suitable closed loop servo system of which the mounting assembly is a part.

The primary, or first, mode stiffness K of a leaf member is defined as the ratio F/D, where F is a component of a force that is perpendicular to the plane of a leaf member and D is the deflection of the leaf member. Since the power utilized in producing the force, and hence the deflection, increases with increasing primary mode stiffness, it is desirable to design the leaves in such a manner so as to minimize the primary mode stiffness. At the same time, it is desirable to raise the frequencies of the vibrations of the higher order modes so as to attenuate the undesirable excitation from the higher frequency oscillations mentioned above. The higher order mode frequencies can be raised by increasing the higher order mode stiffness of the leaf members to values beyond the designed bandwidth of the closed loop servo system, i.e., the higher mode frequencies can be increased so that any undesirable excitation that they may put upon the servo system is so significantly attenuated that the servo system, for all practical purposes, is not subjected to those undesirable effects of the higher order mode vibrations.

It has been found that the dual requirements of suitably low primary mode stiffness and suitably increased higher order mode stiffness cannot be economically met using leaves of uniform thickness and width. U.S. Pat. No. 4,212,043 discloses a solution to this problem wherein the leaf thickness is not uniform. Instead, stiffening members are attached to the central portion of both sides of a much thinner leaf to form laminated leaf composites. This solution, however, can be costly since more parts and additional assembly steps are usually required. Moreover, the stresses on the end portions of the leaves which do not contact the stiffening members are so highly concentrated that it often necessitates that a costly, very thin, high yield strength material be used for this composite laminate construction to maintain the same low primary mode stiffness as with an equivalent constant leaf thickness pantograph mechanism.

Thus, what is desired is a simple and cost effective solution which satisfies the dual requirements of lower primary mode stiffness and increased higher order mode stiffness.

SUMMARY OF THE INVENTION

These and other problems are solved in accordance with the teachings of the present invention with an improved mounting structure, also called a mount, for holding and varying the position of a movable head in a magnetic tape transport The mount exhibits an acceptably low primary mode stiffness and a suitably increased higher order mode stiffness and is adapted for use in a magnetic tape transport employing a closed loop servo system having a specified frequency bandwidth. The mount includes a fixed body and a moveable body such as a magnetic transducing head assembly as well as first and second parallel spaced apart elongated flexible yet similar flexural pantographic leaves. Each flexural pantographic leaf has two opposite ends, two opposite edges and a defined, and preferably uniform, thickness. One set of opposite ends is connected to the fixed body, while the other set of ends is connected to the moveable body. The leaves of the mount include first and second leaf edge extensions, which act as side stiffeners, each edge stiffener being integral with one of the opposite edges of the corresponding leaf. Each leaf side stiffener is positioned and constructed so as to leave the leaf thickness unaltered and to leave the value of the primary mode stiffness substantially unaltered, while at the same time raising the stiffness of the higher mode vibrations to values at which their corresponding natural mode frequencies are substantially higher than the specified frequency bandwidth. Advantageously, the side stiffeners, which minimally increase the primary mode stiffness and which substantially increase the higher order mode stiffnesses of the mount, do not add extra parts to the flexural pantographic leaves themselves.

DETAILED DESCRIPTION

The principles of our invention can be more easily understood by taking the time for a brief review of cited U.S. Pat. No. 4,212,043. That review is also helpful in understanding an environment in which one can practice the principles of our invention.

Figure 1:
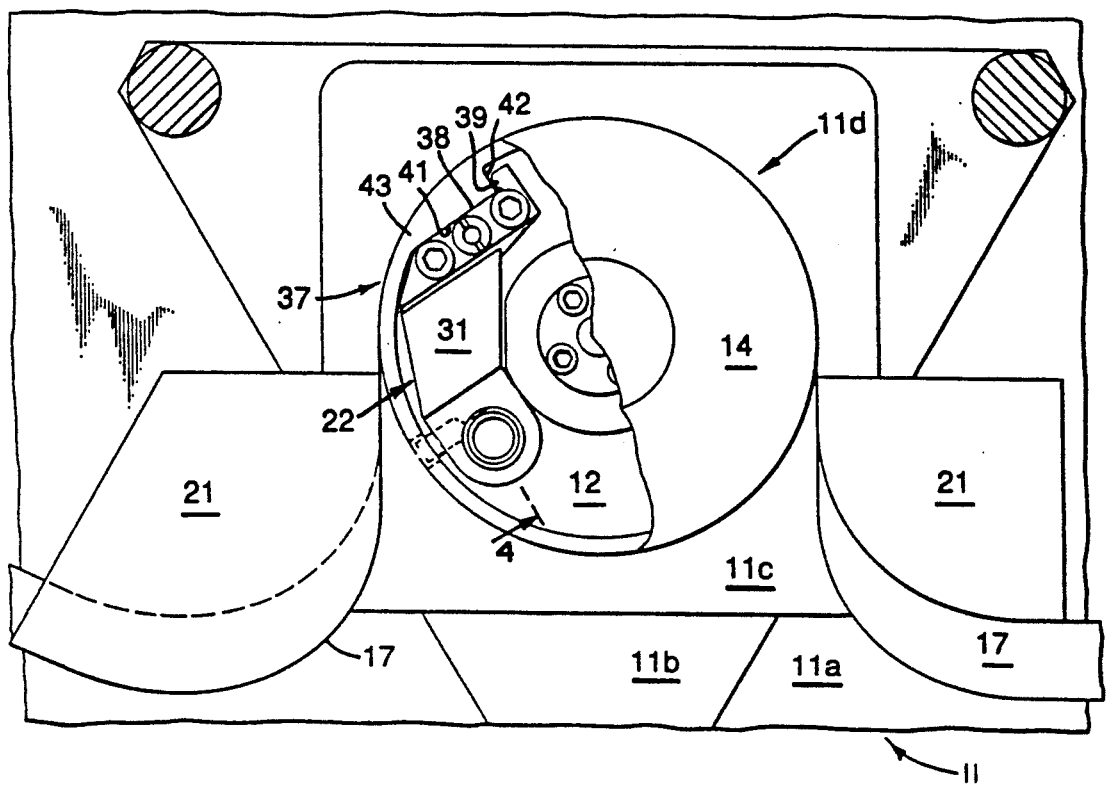
FIG. 1 is a prior art fragmentary and broken-away plan view of a magnetic tape transport of the helical scan type.

Referring now to FIG. 1, there is shown a broad band magnetic tape transport 11 comprising a tape deck 11a on which is mounted triangular framework 11b, which in turn supports a mounting block 11c for a helical tape scanning drum assembly 11d.

Figure 2:
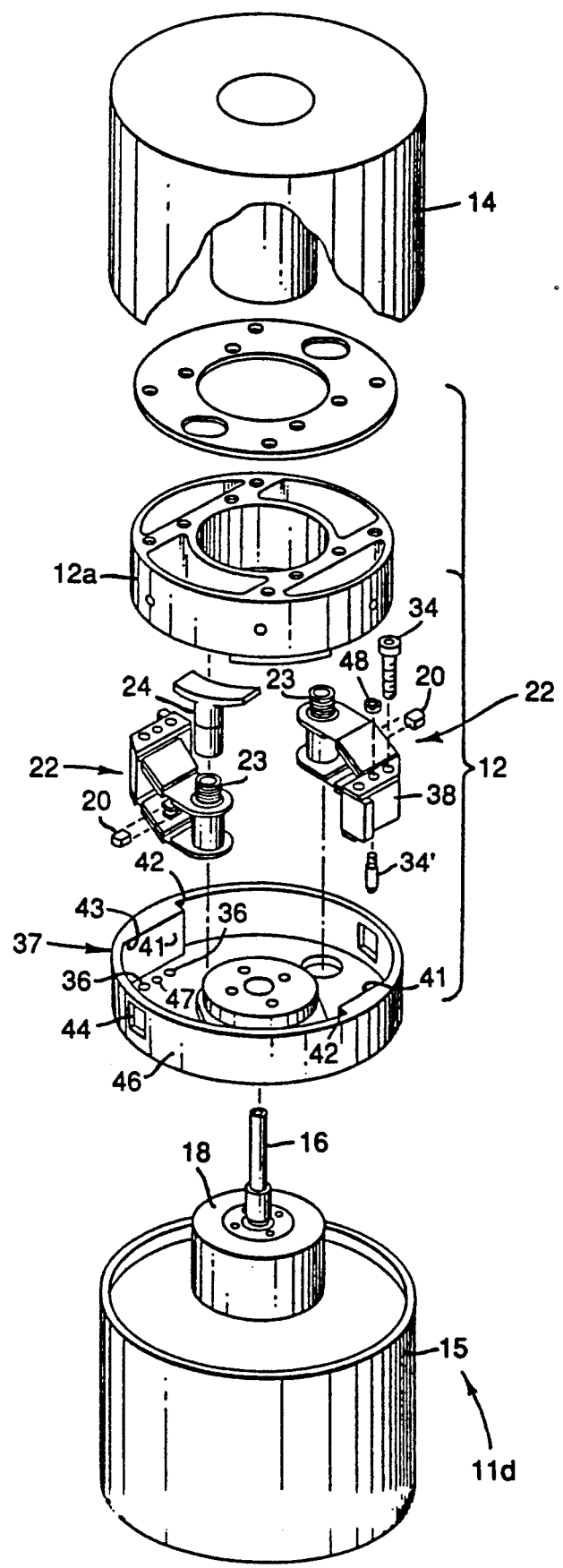
FIG. 2 is a prior art exploded perspective view of a portion of FIG. 1, to a slightly smaller scale, illustrating a prior art structure and assembly.

Referring now to both FIGS. 1 and 2, it will be seen that the drum assembly 11d comprises a rotating central drum portion 12 and stationary upper and lower portions 14 and 15, which are solidly mounted to extend from mounting block 11c, and which constitute mandrels for guiding and forming the tape 17 in a helical path around the rotating drum 12. The rotating central drum 12 is fixed to a shaft 16, which constitutes the drive shaft of a motor 18 that is mounted on the lower drum portion 15. A pair of diametrically opposed magnetic transducing head assemblies 20 are provided for the rotating drum 12, and the tape is guided by means of a pair of tilted guides 21 in a 180 degree "omega" wrap around the scanning drum assembly 11d and between a pair of tape storage and tensioning reels (not shown) of conventional type. The word omega is used to described the wrap because the wrap looks similar to the Greek letter omega, i.e. to the Greek letter $\Omega$. To assist the head assemblies 20 in following various predetermined tracks on the magnetic tape, the head assemblies are each mounted for either rapid or gradual positioning motion in either of the two opposite directions substantially normal to the plane of the rotating drum 12, as by means of springy and flexibly hinged parallel-linkage mounting assemblies 22, also shown in FIG. 3 and also referred herein to as a mounting structure and as a mount. An electrical voice coil 23 is mounted on each mounting assembly 22 and is coupled to a tape transport head positioning servo system 300 for providing reversible currents of varying magnitudes causing the coil to act as the movable element of a linear motor for producing the above-described positioning motion of the head assembly 20. The stator element of the linear motor is constituted by a permanent magnet member 24, which is fixed to the upper portion 12a of rotating drum 12. The portion 12a is made of carbon steel, and also supports a tubular outer pole piece, which circumvallates coil 23, and an inner pole piece that is itself circumvallated by the coil 23. Also, a positional sensing coil (not shown) is mounted on each parallellinkage mounting assembly 22, circumvallating a fixed ferrite element so as to provide a position sensing signal to the servo system 300. The fixed ferrite element (not shown) is mounted in an aluminum bushing within a shielding cup (not shown), which can be made, for example, of magnetic shielding conetic material; and the cup in turn is mounted on an aluminum extension member (not shown), attached to the end of the inner pole piece. The circuits needed to produce the linear motor driving current and the position sensing signal receiving means form no part of the present invention, and may be conventional as in the prior art (see, for example, U.S. Pat. No. 4,485,414).

Now even though it is described in more detail in U.S. Pat. No. 4,485,414, it should be evident that the head assemblies 22, which are to be reciprocatingly moved, each comprise, in this illustrative discussion, up to ten or more individual magnetic pole-and-gap structures 26, each electrically isolated from the others and constituting a separate magnetic transducing head structure. The mass of the "head stack" 20 is far greater than that of the individual transducer structures that have in the prior art been reciprocated satisfactorily, as by means of single leaf structures consisting of bending piezoelectric "bimorph" assembled or pivoting magnetically driven elements. It is also true that the lateral displacements required in a multiple-head stack are greater, and lie generally outside the displacement capability, of the prior art bimorph leaf. The head stack 20 actually weights only a few hundreths of an ounce (or, about 1 gm.) but under the centrifugal forces that are generated during operation, the equivalent mass of such a head stack can be in the neighborhood of 22 pounds (or, about 9.97 kg.). If such a mass were to be fixed at the tip of a bimorph leaf of the prior art, which bends in a characteristic circular arc (see, for example, U.S. Pat. No. 4,151,569), or in an S-shape consisting of two oppositely curving circular arcs (see, for example, U.S. Pat. No. 4,099,211), then the leaf would tend to be pulled out straight, or nearly straight, by the centrifugal force acting on the head stack mass at the tip of the leaf. This straightening-out effect could have some bad results. For example, a first bad result relates to the degree of straightening that would vary for different rotational speeds of the drum, with consequent variations in the contact of head and tape, or of the penetration of the head into the tape. A second bad result would be a sharp increase in the degree of curvature at the point where the bimorph leaf is anchored to the drum structure, resulting in abnormal concentration of stress and rapid failure or short life for the bimorph leaf structure. Furthermore, the desired flexing movement of such a bimorph leaf structure out of the plane of the drum is opposed by an axially directed component of the centrifugal force, whenever the bimorph leaf is out of the drum plane, and the motor forces that may be generated by bimorph structures of the prior art are too small to be used efficiently against the centrifugal force components generated by comparatively massive head stack structures.

Therefore, in order to avoid the straightening-out effect of the leaf described above, the leaf is constructed as an already-straight member of great rigidity and stiffness, except at flexure points adjacent the base and adjacent the magnetic head stack, where the structure operates as a springy flexure hinge and is made of materials that are adapted to withstand stress and fatigue, so as to provide cohesive strength and long life for the combination. Also, two leaves are used, in parallel-motion linkage arrangement, in order to keep the massive head stack correctly oriented during opertion.

Figure 3:
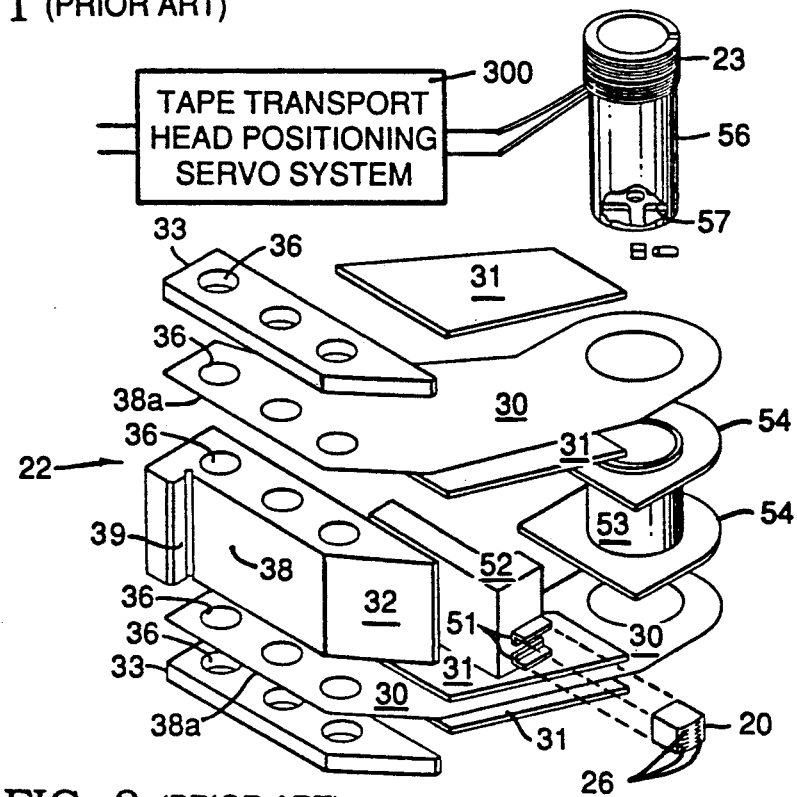
FIG. 3 is a prior art exploded perspective view, to an enlarged scale, of a portion of the prior art springy and flexibly hinged parallel-linkage mount shown in FIGS. 1 and 2.

Accordingly, as shown in FIG. 3, the two leaves of springy and flexibly hinged parallel-linkage mounting assembly 22 are formed as two members 30 of thin "Elgiloy" spring material reinforced by their respective aluminum stiffening members 31, and anchored at the base in a clamping structure consisting of a central spacing block 32 and two sandwiching clamping plates 33, all of aluminum. All of the named parts may be assembled and permanently attached and, where needful, by means of epoxy adhesive. The mounting assembly 22 is clamped together and to the drum 12 by means of three stainless steel bolts 34 passing through conforming holes 36 in the elements and threaded into the structure of the rotating drum main (stainless steel) disc 37 (see also FIG. 2). Actually, the holes 36 (except in the disc 37) are larger in diameter than the bolts 34, so that the bolts function only as clamping bolts; and the base structure is accurately positioned in the plane of disc 37 as by means of orthogonally related gauge surfaces 38 and 39 formed on the spacing block 32, which surfaces are arranged to engage mating gauge surfaces 41 and 42, respectively, formed on the inner side of a peripheral flange 43 of the disc 37. The spring members 30 also have edge surfaces 38a dimensioned to lie in the same plane as surface 38 and to act as positioning edges for the assembly. The surface 41 is formed parallel to the radial plane of the head stack 20 that passes through the drum axis, so that as the block 32 slides or is slidably adjusted along this surface, the head stack 20 is moved radially in or out through a window opening 44, so as to be adjusted for correct radial position with respect to the outer peripheral surface 46 of the drum and to the tape 17. This radial position can be accurately achieved and maintained by means of shims (not shown) placed between the gauge surface 39 of block 32 of block 32 and gauge surface 42 of the disc 37 prior to tightening the clamping bolts. Alternatively, the middle bolt 34 can be formed as a conically tapered screw 34' (FIG. 2) threaded into the middle opening 36 of block 32 and projecting into a conical recess 47 in the disc 37 so that as the screw is screwed in or out, a camming action takes place to position the assembly 22 parallel to gauge surface 41 while positioning the head stack 20, prior to tightening the other two bolts 34. A brass locking nut 48 can be provided to lock the tapered screw 34' in its adjusted position.

As shown in FIG. 3, the head stack 20 of springy and flexibly hinged parallel-linkage mounting structure 22 is mounted between a pair of brackets 51 extending from base housing 52, which is formed as a hollow aluminum box. The housing 52 is affixed to a linear-motor support element 53 consisting of a hollow aluminum tube formed with integral peripheral stiffening flanges 54 adjacent the ends; the ends of spring leaves 30 are affixed to the upper and lower faces of the respective flanges, and the housing 52 is affixed between the flanges. To mount the coil 23, there is provided a hollow tubular magnesium coil form 56, which is affixed within the tubular portion of support element 53. The coil form 56 has an integral hollowed-out spider 57 at the lower end, defining a central tubular opening into which is affixed a Nylon or Derin (Trademarks of Du-Pont) plastic tubular form for the aforementioned sensing coil (not shown).

With that brief review of cited U.S. Pat. No. 4,212,043 and with that description of an environment in which the principles of our invention may be practiced, the description now turns to an explanation of our improvement over the prior art to achieve the objects of the present invention.

Figure 4:
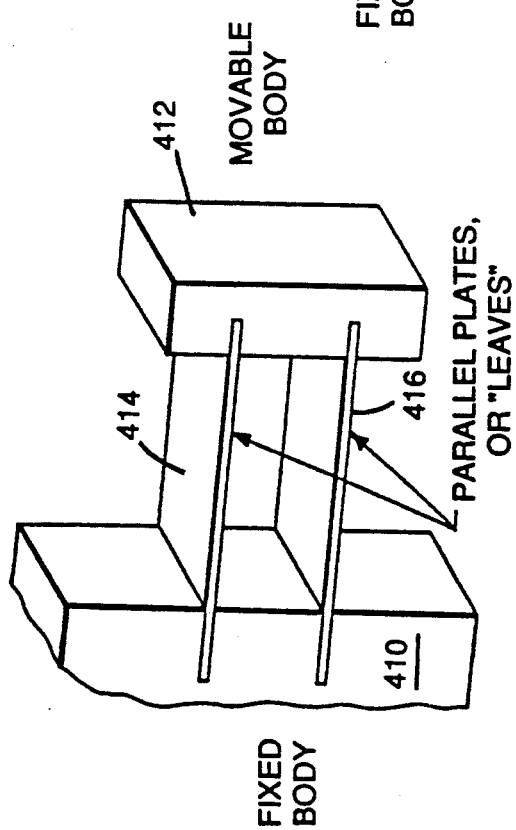
FIG. 4 is a perspective view of a mount employing two parallel leaves having uniform thicknesses.

Referring now to FIG. 4, a fixed body 410, which can be embodied in the prior art clamping structure of FIG. 3 including a central spacing block 32, sandwiching clamping plates 33, and bolts 34, is spaced apart by leaves 414 and 416 from a movable body 412, also called a moveable head assembly or simply a head assembly or a moveable assembly, which can be embodied in the prior art head stack 20, which is mounted between a pair of brackets 51 extending from base housing 52, which is affixed to a linear-motor support element 53 consisting of a hollow aluminum tube with integral peripheral stiffening flanges 54 adjacent the ends of two leaves. First and second parallel and similar leaves 414 and 416 of similar material and uniform lengths and widths, which can be embodied in the two prior art leaves formed as members 30 of thin "Elgiloy" spring material reinforced by the aluminum stiffening members 31, extend between fixed body 410 and moveable assembly 412. One set of ends of the leaves is embedded in, or connected to, body 410, for example, by means of the aforedescribed clamping structure while an opposite set of ends is embedded in, or connected to, moveable assembly 412, for example, by means of the aforedescribed head stack, brackets, base housing, support elements, flanges, and hollow tube structure. The embedded ends of the leaves remain locked, or affixed, or affixed, or attached to, or fastened in position while the main body of the leaves are effectively hinged at the embedded ends.

Figure 5:
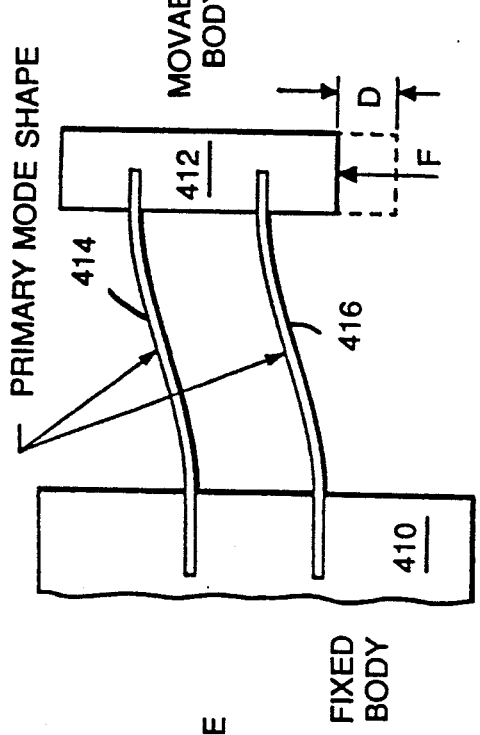
FIG. 5 is a side view of the mount of FIG. 4 when the moveable body is subjected to a force directed perpendicular to the planes of the leaves and the leaves exhibit an "S" shape characteristic typical of a primary mode deflection.

Referring next to FIG. 5, when the moveable body 412, here embodied as the head assembly, is subjected to a force F directed at right angles to the planes of the leaves 414 and 416, the assembly 412 is deflected a distance D in the direction of the force. The leaves 414 and 416 have a primary stiffness K equal to the ratio F/D and exhibit a characteristic "S" shape, which is representative of a primary mode shape 417.

Figure 6:
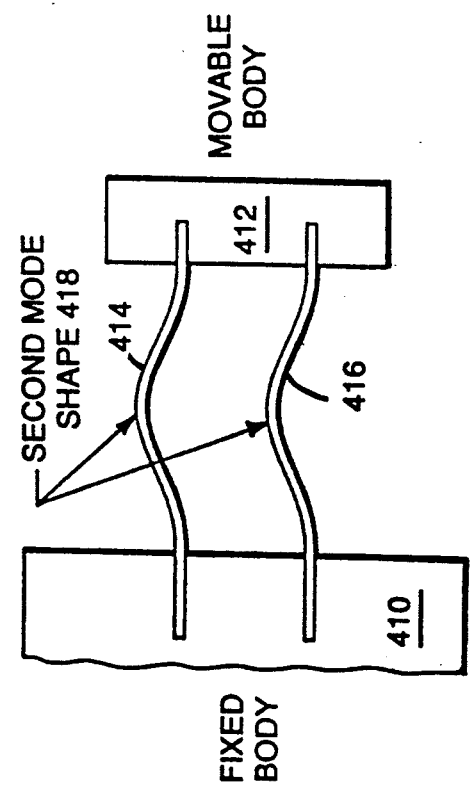
FIG. 6 is a side view of the mount of FIGS. 4 and 5 which exhibits a shape characteristic typical of a higher order secondary mode deflection.

Referring now to FIG. 6, at substantially the same time as the leaves 414 and 416 exhibit the primary mode shape 417, the leaves 414 and 416 have a secondary mode shape 418 with a central upward bulge, which is substantially in the direction of the force F. There may be teriary and even higher mode shapes, which are not shown. The modes, which are higher than the secondary mode, are usually not significant for several reasons. One reason is because the changes in the shapes of the leaves 414 and 416 are very small at the frequencies corresponding to the higher mode shapes. Another reason is because the higher mode frequencies are much higher than the frequency of the secondary mode and hence are generally well beyond the design bandwidth of a closed loop servo system of which the soon-to-be-described side-stiffened flexural pantographic mount for positioning a magnetic transducing head assembly is an element. Therefore, for purposes of illustration and not by way of limitation, modes higher than the secondary mode need not be further described.

Figure 7:
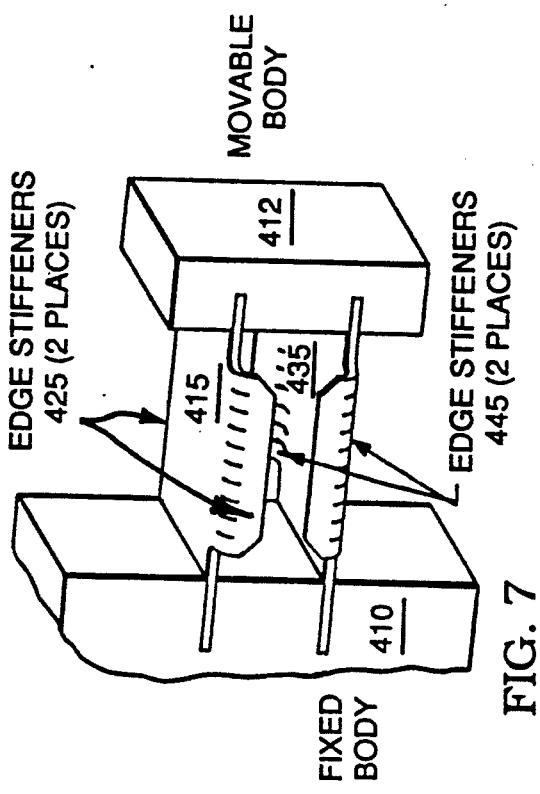
FIG. 7 is a perspective view of a mount in accordance with one embodiment of the principles of our invention.

Referring nextly to FIG. 7 and in accordance with the principles of our invention, there are leaf side stiffening extensions 425 and 445, respectively, along both of the longitudinal edges of each of the two leaves 415 and 435, respectively. The side extensions 425 and 445 are, respectively, integral with the leaves 415 and 435, respectively, and can have preferably the same, but can be a different, thickness and can be made of preferably the same, but can be a different, material as the leaves. (This will become more evident in relation to a description of FIG. 12.) The "side stiffeners," which is a term we use interchangeably with the term "side extensions," alter the boundary conditions of the respective leaves 415 and 435 from (a) being secured or clamped only at their opposite ends near where they are embedded in the fixed body 410 and the moveable body 412 to (b) creating an effect reminiscent of securing or clamping the side edges of the leaves as well as securing or clamping their opposite ends. The leaf side stiffeners are positioned longitudinally along both of the edges of each of the leaves and are constructed so that the thickness of the respective leaves remains unaltered from that earlier described. Note from the above that, but for each of leaves 415 and 435 having two side stiffening extension 425 and 445, leaves 415 and 435 (a) are reminiscent of leaves 414 and 416, respectively, and (b) are reminiscent of leaves 30 without their top and bottom stiffening members 31. From that structure very important and advantageous results obtain.

Some surprising improvements result from the side stiffened structure just described when compared, for example, to the springy and flexibly hinged parallel-linkage assemblies 22 of the prior art. For example, on the one hand, the value of the primary mode stiffness of the respective leaves 415 and 435 with side stiffening is substantially unaltered when compared to the value of the primary mode stiffness of the respective leaves 414 and 416, respectively, without side stiffening. Also, for example, on the other hand, the values of the second and higher mode stiffness vibrations of the respective side stiffened leaves 415 and 435 are substantially raised to values well beyond a designer specified frequency bandwidth for the closed loop servo system of which the moveable head assembly is an element.

While the extensions are shown in FIG. 7 with the upper leaf extensions 425 bending downwards and the lower leaf extensions 445 bending upwards, that is only for purposes of illustration and not by way of limitation. The illustrated bending is used to save space when the leaves are disposed in the entire mounting structure 1050 of FIGS. 10 and 11 and hence the illustrated bending does not constitute a requirement of the invention. Indeed, the upper leaf extensions 825 of FIGS. 8–12 could bend upwards and the lower leaf extensions 845 of FIGS. 8–12 could bend downwards or the upper leaf extensions and the lower leaf extensions could bend in the same direction whether that be upwards or downwards. The extensions 425 and 445 can be placed anywhere along the edges of the leaves but are preferably, but not necessarily, located in a substantially central position along the longitudinal sides of respective leaves 415 and 435 so as to be approximately coincident with the bulge of the secondary mode shape 418 shown in FIG. 6.

Figure 8:
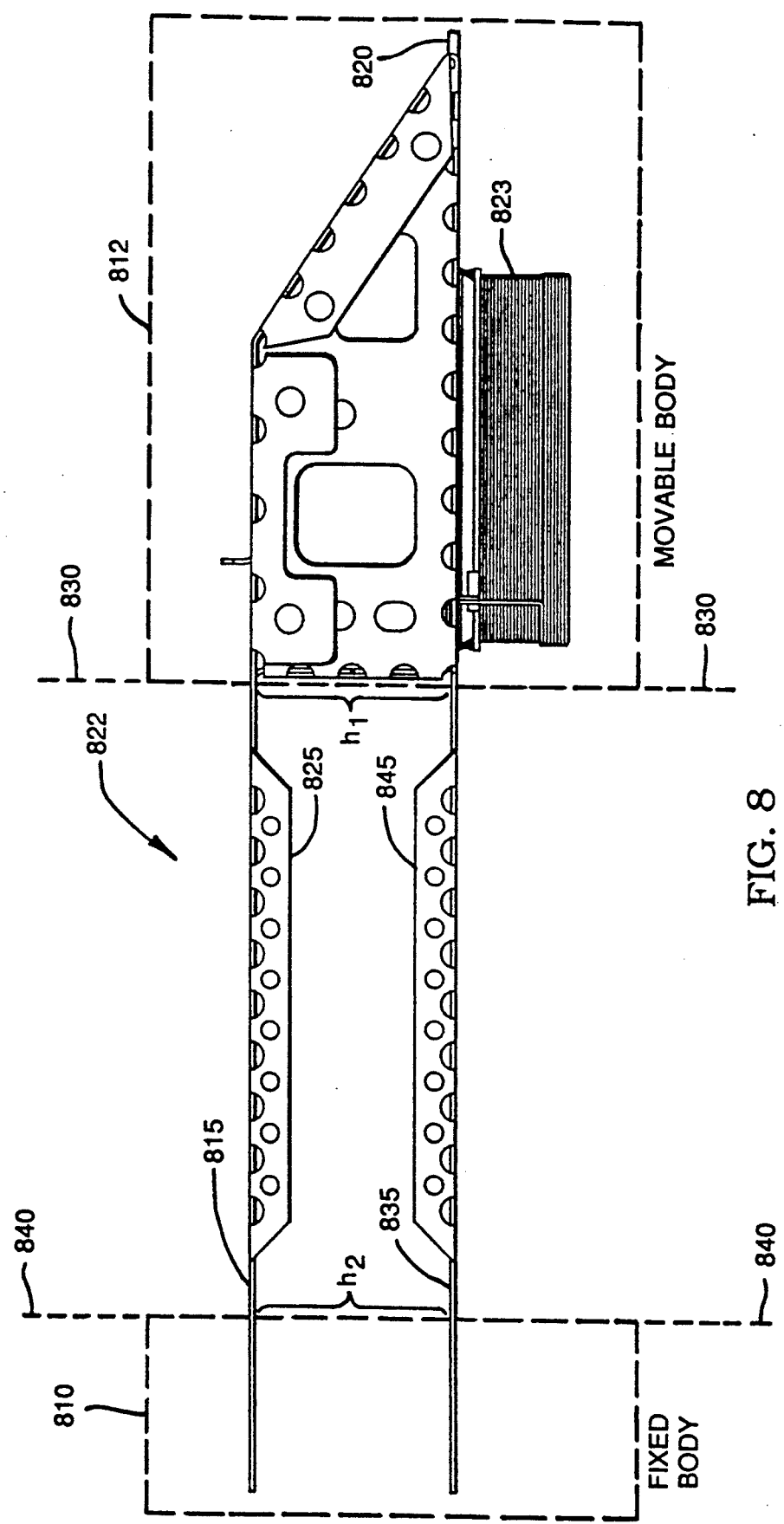
FIG. 8 is a side view of a side-stiffened flexural pantographic mount for positioning a magnetic transducing head stack included in a moveable body head assembly mount in accordance with a second embodiment of the principles of our invention.
Figure 9:
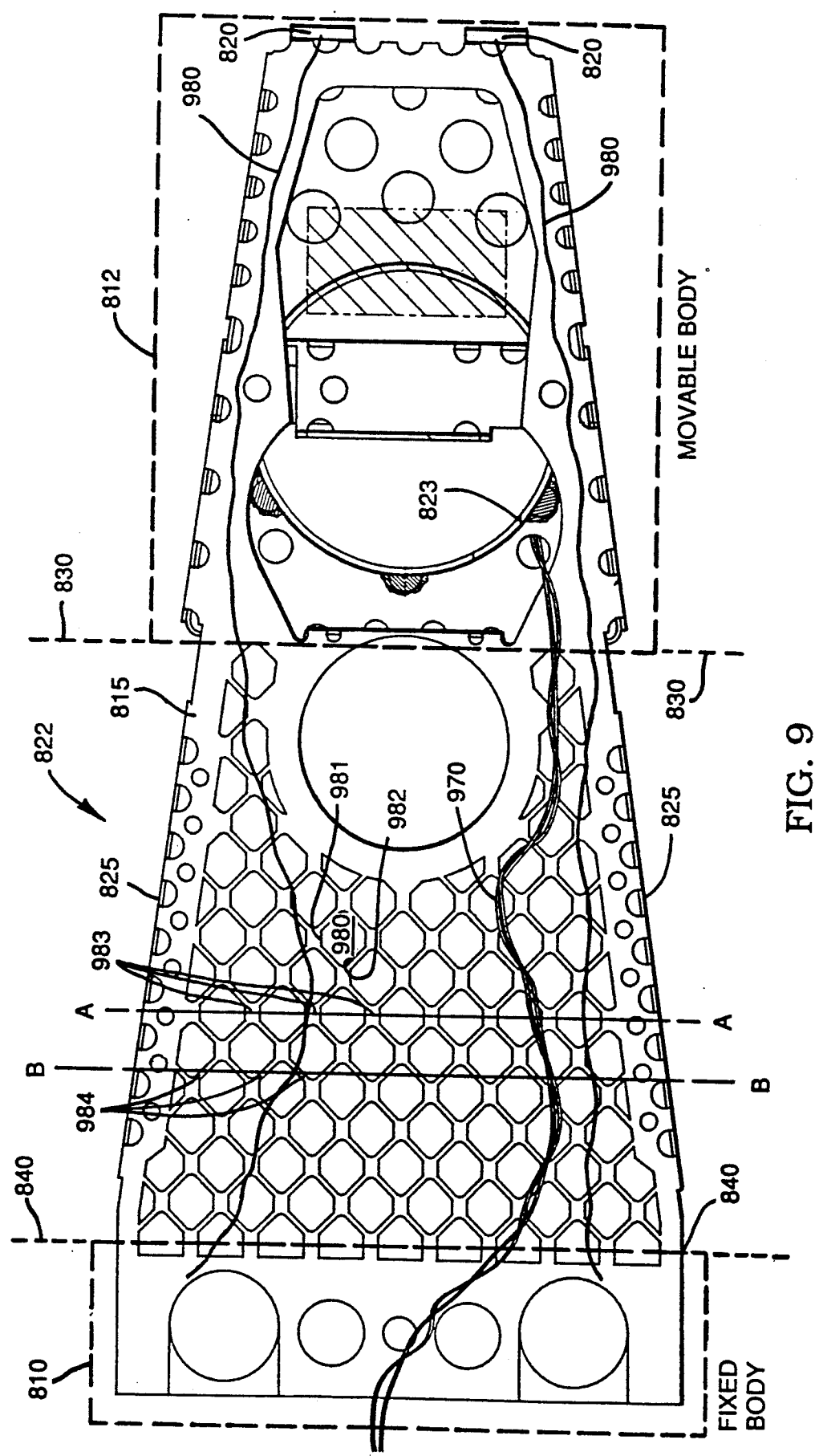
FIG. 9 is a top view of the side-stiffened flexural pantographic mount shown in FIG. 8.

Referring now to FIGS. 8 and 9, there is shown, respectively, a side view and a top view of a side-stiffened flexural pantographic mount 822 for positioning a magnetic transducing head stack 820 included in a moveable body head assembly 812 in accord with the principles of our invention. Fixed body 810 is spaced from moveable body 812 by the main body of first and second parallel leaves 815 and 835, respectively. As an aside, note that fixed body 810 and moveable body 812 are shown in FIGS. 8–11 as rectangular graphics around certain parts of side-stiffened flexural pantographic mount 822 to illustrate those parts of the mount, which form, respectively, the fixed body and the moveable body. It may be more clear from FIG. 12 that the rectangular graphics are just pictorial tools, which aid in the description of the principles of our invention, and are not themselves solid members of the mount. Note also that, since leaves 815 and 835 are parallel, the distance between the leaves at hinge plane 830 of the moveable body 812 in FIG. 8, which is called distance $h_1$, is therefore substantially identical to the distance between the leaves at hinge plane 840 of the fixed body 810 in FIG. 8, which is called distance $h_2$. It may be also noted that a pantographic mount is obtained when the two distances $h_1$ and $h_2$ are equal while a non-pantographic mount is obtained when the two distances $h_1$ and $h_2$ are not equal. On the one hand, it can be noted that, if distance $h_2$ is greater than distance $h_1$, then the primary mode stiffness of flexural mount 822 will increase. A flexural mount, in which the primary mode stiffness has increased, would typically require more power to operate coil 823 (or in the prior art coil 23). On the other hand, it can be noted that, if distance $h_2$ is less than distance $h_1$, then the primary mode stiffness of flexural mount 822 will further decrease. A flexural mount, in which the primary mode stiffness has decreased, would typically require less power to operate coil 823 (or in the prior art coil 23). Indeed, when the distance $h_2$ is reduced to zero, then the leaves are joined in a manner such that the mount behaves in a manner like a cantilever beam whereas, when the distance $h_2$ greater than zero but less than the distance $h_1$, then the mount behaves in a manner intermediate between a cantilever beam and a pantographic mount. Accordingly, for our purposes, but not by way of limitation, while some advantages and disadvantages are obtainable when the two distances, $h_1$ and $h_2$, are not substantially identical, i.e. when the leaves 815 and 835 are not parallel, our preferred embodiment is to have leaves 815 and 835 be approximately parallel and hence to behave as a pantographic mount. It may be further noted, therefore, that hinge planes 830 and 840 are also themselves substantially parallel to each other. Continuing, for the moment consider the leaves as parallel whereupon the two pairs of longitudinal side extensions 825 and 845 (one pair of side stiffeners 825 being integral with the respective two sides of leave 815 and the other pair of side stiffeners 845 being integral with the respective two sides of leave 835) have been found to raise the primary mode stiffness of the flexural pantographic mount 822 only a small amount while at the same time the side extensions have been found to provide the desired substantial increase in the secondary mode stiffness.

The following example illustrates that primary mode/secondary mode stiffness finding for a ten-to-one scale model, i.e. a ten times enlarged scale model, of a side-stiffened flexural pantographic mount for positioning a magnetic transducing head stack in accordance with the principles of our invention. Leaves (815,835) of a thickness of about 0.04 inches, which are generally trapezoidal in shape and which are constructed from aluminum sheets, are formed with side-stiffening edge extensions (825, 845) having lengths equal to about three-quarters (¾) the length of the associated leaf as measured between the hinge plane 840 of fixed body 810 and the hinge plane 830 of moveable body 812. The trapezoidal shape, which is more clear from FIG. 9 when viewed looking at the top of leaf 815 of flexural pantographic mount 822, helps reduce the mass of the respective leaves (815, 835). The front end (i.e., the end towards hinge plane 830) of a leaf is the end to which is attached the moveable body head assembly 812. It may be of interest to note that the front end of a leaf is also the end of a leaf that typically undergoes the largest deflection. The ten-to-one scale model also included a back end (i.e., the end towards hinge plane 840), which is the end attached to the fixed body 810. The back end (840) width is about 5.3 inches while the front end (830) width is about 4.0 inches. The length of the main body of each of the leaves as measured between front end hinge plane 830 and back end hinge plane 840 is about 6.0 inches. The longitudinal lengths of the respective side stiffening extensions (825, 845) are about 4.1 inches, which as mentioned above is about three-quarters the front-to-back length of the respective leaf (815, 835). The edge extension height, as either an upward or a downward edge extension, is commensurate with the thickness of the leaf, for example, in our ten-to-one scale model the edge extension (825, 845) height is equal to about eight times the thickness of the leaf, or about 0.3 inches high. As an aside, it should be mentioned that there is no minimum height requirement for the edge extension side stiffeners to become effective. Continuing, with that described structure of a ten-to-one scale model embodiment of the principles of our invention, the primary mode frequency of mount 822 is found to have increased a small amount, that is, it increased from 11.1 hertz (Hz) to 11.7 Hz, which is an increase in primary mode stiffness of about 11 percent. However and of notable comment, with the side stiffeners in place, the secondary mode frequency is found to have substantially increased, here it increased from 167 Hz to 303 Hz, which is an increase in secondary mode stiffness of about 329 percent.

Unlike the prior art leaves 30, which have their stiffening members 31 shown in FIGS. 1, 2 and 3, and unlike the unstiffened leaves (414, 416) shown in FIGS. 4, 5, and 6, the ten-to-one scale model embodiment of a side-stiffened flexural pantographic mount for positioning a magnetic transducing head stack assembly in accord with the principles of our invention could be embodied with solid aluminum leaves. However, rather than use solid aluminum leaves, the leaves in the ten-to-one scale model embodiment were embodied in an aluminum mesh. Although the leaves (815, 835) of FIGS. 8 and 9 illustrate a diamond shaped mesh 980, the ten-to-one scale model embodiment uses a circular hole shaped mesh comprising a plurality of regularly spaced circular holes, each hole having a diameter of approximately ⅛ inches. Notwithstanding, we will later make clear that a diamond shaped mesh 980 of FIGS. 8 and 9 is actually preferred over the circular shaped mesh.

Several advantages are obtained with the circular shaped mesh that was actually used in the ten-to-one scale model embodiment.

First, the slight increase in primary mode frequency and the substantial increase in higher secondary mode frequency are obtained when the side stiffened aluminum leaves include a mesh structure. It can be noted that this result is also obtained when the side stiffened aluminum leaves are embodied in a solid leaf structure (versus the mesh leaf structure). It is the side stiffening which creates one beneficial result in using the principles of the present invention. It is the mesh structure which creates another beneficial result in using the principles of the present invention.

Second, the mass of the leaf structure is substantially reduced when the aluminum material is omitted from the circular holes in creating a leaf structure with a circular shaped mesh. Indeed, when compared to side stiffened aluminum leaves with a solid leaf structure, the side stiffened aluminum leaves with a circular shaped mesh gives rise to a structure in which the mass of the leaves is reduced by about fifty per-cent (50%). The lower mass leaf structure allows the leaf structure to be more responsive to external driving forces. The lower mass leaf structure also requires less power for deflecting the moveable body. Electrical power is providable over leads 970 by a tape transport head positioning servo system 300 for providing reversible currents of varying magnitudes causing voice coil 823 to act for producing a positioning motion on the head assembly 20 whereby moveable body 812 can be deflected in a manner akin to prior art electrical voice coil 23 being mounted on each mounting assembly 22 and being coupled to means for providing reversible currents of varying magnitudes causing the coil 23 to act as the movable element of a linear motor for producing the positioning motion of head assembly 20. It can be noted that this beneficial result is not obtained when the side stiffened aluminum leaves are embodied in a solid leaf structure (versus the mesh structure).

Third, while there is a great reduction in primary stiffness of the leaf when a mesh leaf structure rather than when a solid leaf structure is used, there is only a slight reduction in torsional stiffness of the leaf when the side stiffening leaf extensions are longitudinally added to the two sides of each leaf.

Accordingly, because of the advantages obtained by such factors as reduced mass as well as ease of response to changes in electromagnetic fields as well as the reduction in the magnitude of electrical power consumed for deflecting moveable body 812, the circular mesh leaf structure is preferred over the solid leaf structure.

In yet another embodiment, albeit a preferred embodiment, of the principles of our invention, the leaves (815, 835) shown in FIGS. 8 and 9 are formed with a plurality of diamond shaped holes exemplified by diamond shaped hole 980. As an aside, it may be noted that it is somewhat easy to discuss the diamond shaped holes 980 through the analogy that each diamond shaped hole looks similar to a baseball field, or baseball diamond, with angular lengths that are like the base paths on the baseball diamond and with corners that are like the four bases on the baseball diamond. Continuing with the use of the baseball analogy in describing a one-to-one model of flexural pantographic mount 822, the base paths have an angular length 982 of about 0.02998 inches along each of the four angular sides like angular length 982 and the corners have a corner length 981 of about 0.011314 inches along each of the four corner sides. In that manner, the skilled artworker can form a diamond shaped aluminum mesh embodiment rather than the circular shaped mesh used in the ten-to-one scale model embodiment.

Some further construction features will shortly also be described. However, for the moment, in addition to the advantages already mentioned for the circular shaped leaf mesh structure when compared both to the prior art and to the earlier described solid side stiffened leaf structure, the diamond shaped leaf mesh structure provides even more advantages.

First, the mass of the diamond shaped leaf mesh structure is even further reduced vis-a-vis either the side stiffened circular shaped leaf mesh structure or the side stiffened solid leaf structure, which makes the side stiffened leaf structure formed with the diamond shaped mesh even more responsive to external driving forces than either of the other two side stiffened structures. Indeed, while, as mentioned, the circular shaped leaf mesh structure permits a reduction in the mass of the leaves of about fifty per-cent (50%) over a solid aluminum leaf structure, the diamond shaped leaf mesh structure permits an even greater reduction in the mass of the leaves. Our studies have shown reductions in mass of more than sixty per-cent (60%) over a solid aluminum leaf are realizable. That further means that the mass of a diamond shaped leaf mesh structure also requires even less power to deflect the moveable body than did the circular shaped leaf mesh structure.

Second, the diamond shaped leaf mesh structure can be constructed in such a manner that the cross-sectional area through the width of the leaf remains approximately constant. This construction has the positive effect of distributing fatigue caused by the up and down deflection motion of the leaf over the cross-sectional width of the leaf—thereby prolonging the life of the leaf structure. To understand this advantage, consider in FIG. 9 that cross-sections A—A and B—B (i) are parallel to each other and (ii) are also parallel to fixed body 810 and moveable body 812 and (iii) are also parallel to hinge planes 830 and 840 and (iv) are drawn, respectively, through (a) the mid-points of the corner sides 981 of a plurality of adjacent diamond shaped holes 980 and (b) the mid-points of the angular lengths 982 of a plurality of adjacent diamond shaped holes 980.

On the one hand, focus attention on cross-section A—A. Note that adjacent diamond shaped holes such as 980 are separated by corner mesh remnants 983, which have a corner length 981 of about 0.011314 inches in a direction approximately perpendicular to the line of cross-section A—A and which have a width of about 0.014142 inches in a direction approximately parallel to the line of cross-section A—A, all in a full-sized one-to-one model mount 822 incorporating the principles of our invention.

On the other hand, focus attention on cross-section B—B. Note that adjacent diamond shaped holes such as hole 980 are also separated by angular mesh remnants 984, which have an angular (base path) length mesh 982 of about 0.02998 inches in a direction, which is approximately 45 degrees to the line of cross-section B—B, and which have a width of about 0.007071 inches in a direction approximately parallel to the line of cross-section B—B, all in a full-sized one-to-one model mount 822 incorporating the principles of our invention.

Note that angular mesh remnant 984 in the direction of the line of cross-section B—B has an width of about 0.007071 inches, which is about one-half the width of corner mesh remnant 983 in the direction of the line cross-section A—A. Note also that there are two angular mesh remnants 984, each with a width of about 0.007071 inches, for each corner mesh remnant 983, each with width of about 0.014142 inches. In that manner the width of the remnants which form the mesh across the line of cross-section A—A remains about equal to the width of the remnants which form the mesh across the line of cross-section B—B. Further, in that manner, the diamond shaped mesh can be constructed so that the cross-sectional area through the width of the leaf remains approximately constant whereby the fatigue from deflective up and down motion is distributed over the width of each cross-section of the leaves, thereby prolonging the life of the mesh leaf structure.

Figure 10:
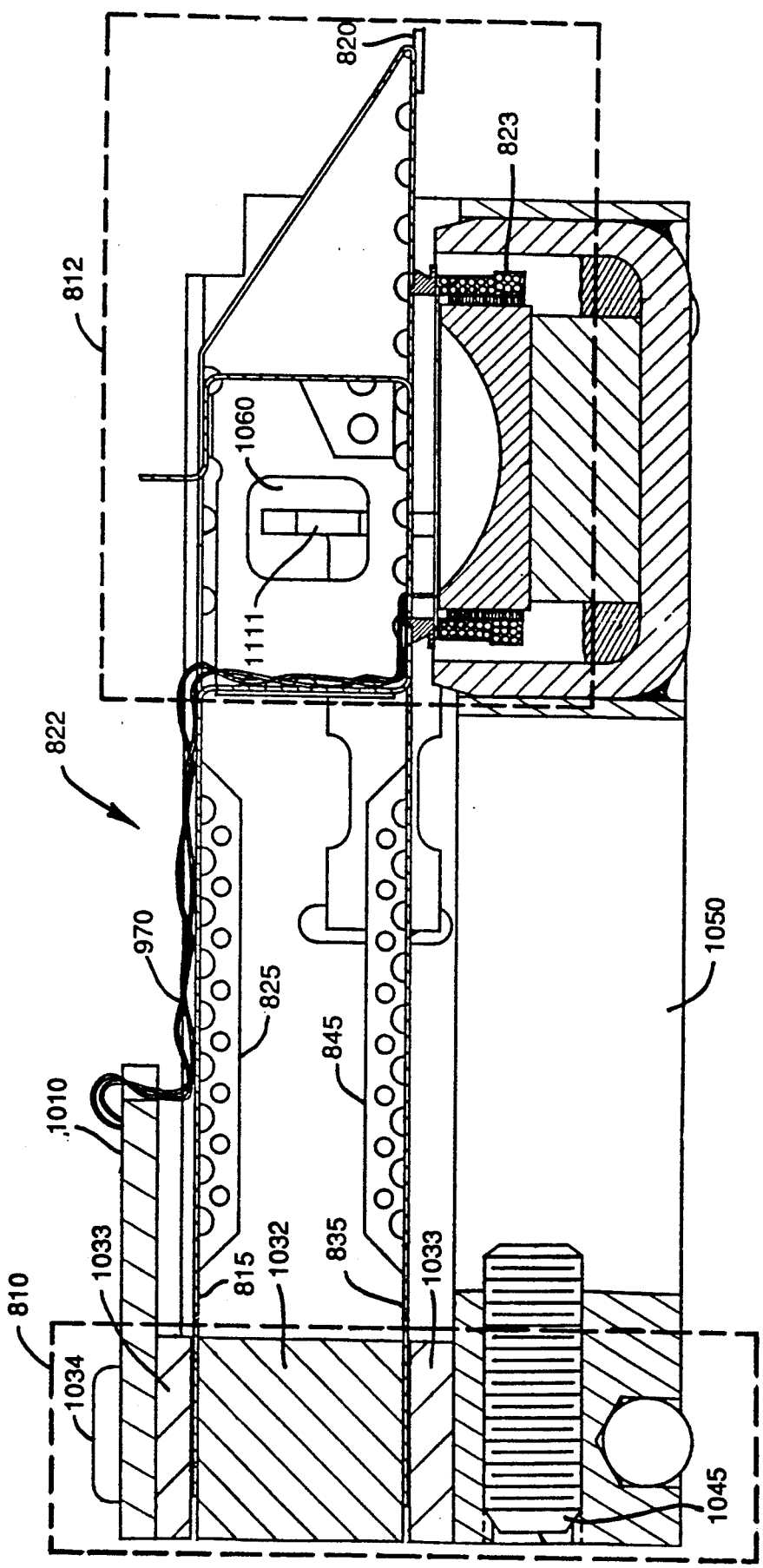
FIG. 10 is a side view of the side-stiffened flexural pantographic mount shown in FIGS. 8 and 9 when same is clamped within a housing.
Figure 11:
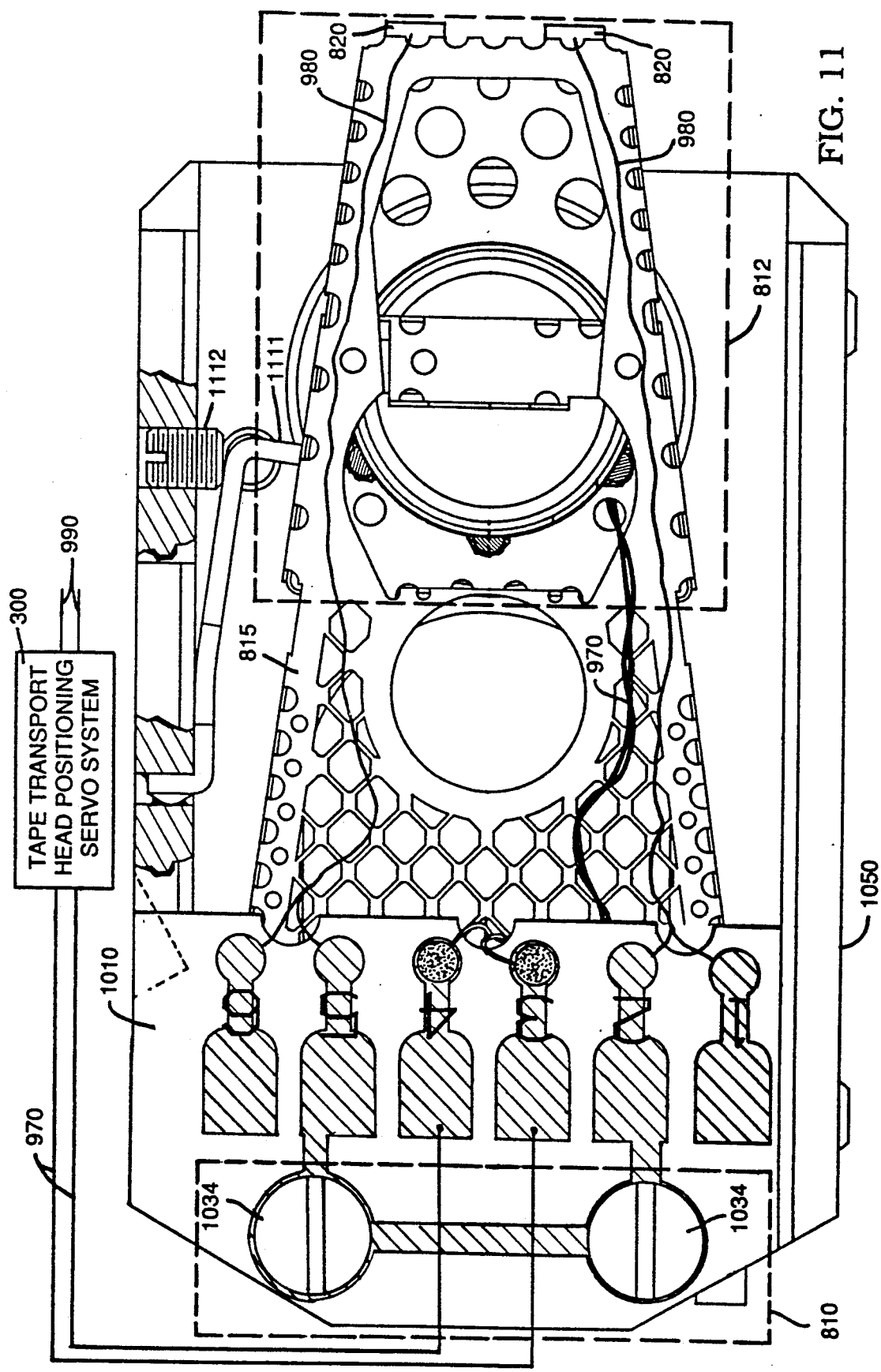
FIG. 11 is a top view of the side-stiffened flexural pantographic mount shown in FIGS. 8 and 9 when same is clamped within a housing as shown in FIG. 10.

Referring to a side view and to a top view, respectively shown in FIGS. 10 and 11, of the side-stiffened flexural pantographic mount 822, pantographic mount 822 for positioning a magnetic transducing head stack 820 included in a moveable body head assembly 812 is shown clamped to a fixed body 810, all within an aluminum housing 1050. Side stiffened leaves 815 and 835 are shown clamped on either side of aluminum central spacing block 1032 by sandwiching clamping plates 1033 and bolts 1034. Disposed between upper clamping plate 1033 and the head of bolt 1034 is a printed circuit board 1010 to which and from which power and signals, such as the power over leads 970 to coil 823 and such as the signals over leads 980 to and from head stack 20 are provided. Also bolt 1045 is for suitably securing the fixed body 810 thereby formed to the housing 1050. Further window 1060 in moveable body 812 is for inserting a movement limiting device 1111 for limiting the up and the down deflection of mount 822 and its head stack 820 to maximum design limits. Movement limiting device 1111 can be suitably positioned within window 1060 by adjusting bolt 1112.

Figure 12:
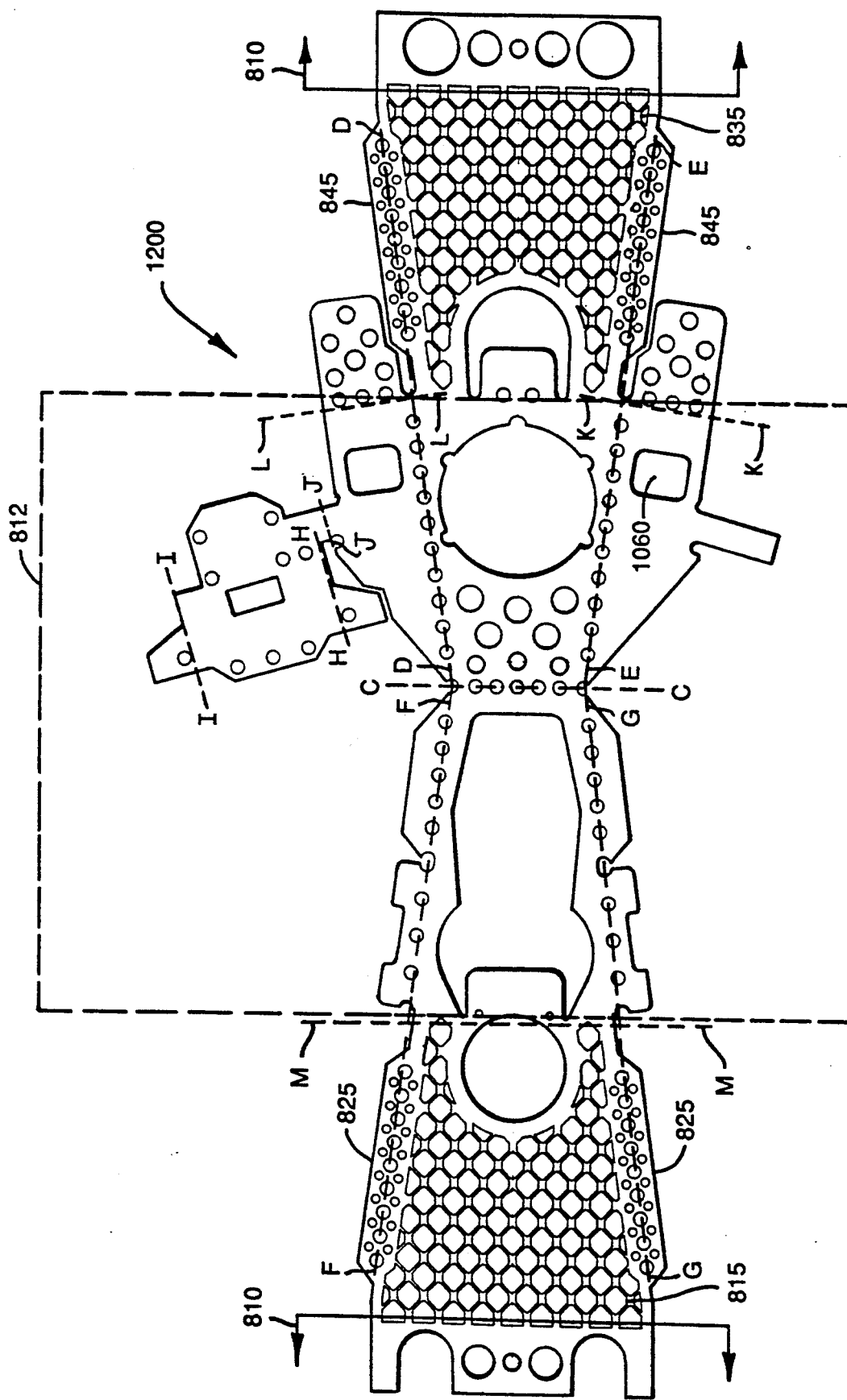
FIG. 12 is a top view of a single aluminum piece, which has been formed to be folded into the shape of the side-stiffened flexural pantographic mount shown in FIGS. 8-11.

Referring to FIG. 12, there is illustrated a flat piece of aluminum 1200, which has been embodied with diamond shaped holes 980, that is suitably shaped as a form from which a flexural pantographic mount 822 can be constructed in accordance with the principles of our invention. Note that a plurality of fold lines are illustrated in FIG. 12. For example, folding the piece of aluminum 1200 in an upward direction from the plane of FIG. 12 along fold lines D—D and E—E forms side stiffeners 845 along both side of leaf 835. Similarly, folding the piece of aluminum 1200 in an upward direction from the plane of FIG. 12 along fold lines F—F and G—G forms side stiffeners 825 along both side of leaf 815. Folding leaf 815 around fold line C—C then brings leaf 815 over the top of leaf 835. Leaf 815 may also be folded along fold line M—M to create the needle node look of flexural pantographic mount 822 as viewed in FIGS. 8-11. Further folds around other fold lines (some of which are shown and other of which are readily discernible to the skill artworker from the drawings and from the earlier description) like around fold lines H—H, I—I, J—J, K—K and L—L. Thereby mount 822 can be formed from a single piece 1200 of aluminum. Thereafter head stack 20 can be affixed to mount 822, for example, by epoxy to the underside of leaf 835 in the area of fold line C—C.

The foregoing description of the principles of our invention is by way of illustration only and not by way of limitation. For example, although several illustrative embodiments of a flexural pantographic mount in accordance with the principles of our invention have been shown and described, other alternative embodiments are possible and would be clear to one skilled in the art upon an understanding of the principles of our invention. Certainly the principles of my invention have utility apart from recording signals on, and playing signals back from, magnetic tape, for example, in a focusing mechanism for use with optical compact disc recorders. Accordingly, the scope of our invention is to be limited only by the appended claims.

What is claimed is:

1. A mount for holding and varying the position of a magnetic transducing head assembly, the mount comprising:
    a fixed body;
    a moveable body;
    first and second parallel spaced apart elongated flexible and similar leaves, the leaves being of similar material, each leaf having opposite ends, opposite edges, a defined thickness, and a mesh structure, a first set of the opposite ends of the leaves being connectable to the fixed body and a second set of the opposite ends of the leaves being connectable to the moveable body,
    the leaves, responsive to the moveable body being subjected to a force, being adapted to deflect a distance and being adapted to exhibit a primary mode stiffness and being adapted to exhibit a higher than primary mode stiffness;
    first and second edge extension means for side stiffening a leaf, each edge extension means being of similar material to a corresponding leaf and each edge extension means being integral with a respective opposite edge of a corresponding leaf so as to raise higher mode vibrations to frequency values substantially greater than a specified bandwidth without at the same time altering the thickness of the corresponding leaf and without substantially altering the primary mode stiffness of the corresponding leaf.

2. The mount of claim 1 wherein each edge extension means includes an outward extension of a portion of each of the edges of the corresponding leaf.

3. The mount of claim 1 wherein each edge extension means is substantially centered on a corresponding edge of a main body of each leaf, the main body being that portion of the leaf extending between the fixed body and the moveable body.

4. The mount of claim 1 wherein the first set of connectable opposite ends is clamped to the fixed body.

5. The mount of claim 1 wherein each edge extension has a height, the edge height being commensurate with the thickness of the corresponding leaf.

6. The mount of claim 1 wherein the fixed body includes a spacing block disposed between the two leaves, which comprise the first set of opposite ends of two leaves.

7. A flexural pantographic mount for use in a helical scan magnetic tape transport employing a closed loop servo system having a specified frequency bandwidth, the mount comprising:
    a fixed body;
    a magnetic transducing head assembly;
    first and second parallel spaced apart elongated flexible and similar leaves, each leaf having opposite ends, opposite edges and uniform thickness, the leaves being of similar material, one set of opposite ends of the leaves being connected to the fixed body, the other set of opposite ends of the leaves being connected to the head assembly, the leaves being flexible with the assembly undergoing a deflection and the leaves exhibiting a primary mode stiffness and the leaves also exhibiting shapes defined by secondary and even higher order natural mode vibrations with frequencies falling beyond the specified bandwidth; and
    first and second side-stiffening means of similar material, each side-stiffening means being integral with the opposite edges of the corresponding leaf without altering the thickness thereof to leave the value of primary mode stiffness of the leaf substantially unaltered and at the same time to raise the frequencies of the natural mode vibrations of the leaf to values substantially higher than the specified bandwidth.

8. The mount of claim 7 wherein each leaf has a mesh structure.

9. The mount of claim 7 wherein each side-stiffening means includes an outward extension of a portion of each of the opposite edges of the corresponding leaf.

10. The mount of claim 9 wherein each extension is centered on the corresponding edge of the corresponding leaf which extends between the fixed body and the head assembly.

11. The mount of claim 10 wherein the set of corresponding opposite ends of the leaves are connected to the fixed body by being clamped to the fixed body.

12. The mount of claim 11 wherein the height of each edge extension is commensurate with the thickness of the corresponding leaf.

13. The mount of claim 12 wherein the fixed body includes a spacer disposed between the ends of the two leaves.

14. In combination with a helical scan magnetic tape transport employing a closed loop servo system having a specified frequency bandwidth, a mount comprising:
    a fixed body;
    a magnetic transducing head assembly;
    first and second parallel spaced apart elongated flexible yet similar leaves, each leaf having a mesh structure with opposite ends, opposite edges and uniform thickness, the leaves being of similar material, one set of ends of the leaves being connected to the assembly;
    first means clamping the opposite set of ends of the leaves to the body;

the leaves, when the assembly is subjected to a force, being flexed into an first shape with the assembly undergoing a deflection, and the leaves exhibiting a primary mode stiffness, and the leaves also exhibiting other shapes defining secondary and higher order natural mode vibrations;

third and fourth side-stiffening means of similar material to the first and second leaves, each means being integral with the opposite edges of the corresponding leaf without altering the thickness thereof to leave the value of primary mode stiffness substantially unaltered and at the same time to raise the frequencies of the natural mode vibrations to values substantially higher than the specified bandwidth.

15. The combination of claim 14 wherein the fixed body is of a material similar to that of the leaves.

16. The combination of claim 15 wherein the fixed body includes a spacer disposed between the leaves.

17. The combination of claim 16 wherein each of the third and fourth side stiffening means includes an outward extension of each of the edges of the corresponding leaf, each edge extension on the corresponding edge of its corresponding leaf, which extends between the fixed body and the head assembly, the height of each edge extension being commensurate with the thickness of the corresponding leaf.

* * * * *